United States Patent
Nordstoga et al.

(10) Patent No.: US 10,269,178 B2
(45) Date of Patent: Apr. 23, 2019

(54) METHOD FOR VISUALISING SURFACE DATA TOGETHER WITH PANORAMA IMAGE DATA OF THE SAME SURROUNDING

(71) Applicant: MY VIRTUAL REALITY SOFTWARE AS, Oslo (NO)

(72) Inventors: Asmund Moen Nordstoga, Oslo (NO); Olav Sylthe, Oslo (NO)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 348 days.

(21) Appl. No.: 14/849,515

(22) Filed: Sep. 9, 2015

(65) Prior Publication Data

US 2016/0071314 A1    Mar. 10, 2016

(30) Foreign Application Priority Data

Sep. 10, 2014   (EP) .................................... 14184275

(51) Int. Cl.
*G06T 19/00* (2011.01)
*G06T 17/05* (2011.01)
*G06T 15/20* (2011.01)

(52) U.S. Cl.
CPC .......... *G06T 19/003* (2013.01); *G06T 15/205* (2013.01); *G06T 17/05* (2013.01); *G06T 2215/12* (2013.01)

(58) Field of Classification Search
None
See application file for complete search history.

(56) References Cited

U.S. PATENT DOCUMENTS

| 6,496,189 B1 | 12/2002 | Yaron et al. |
| 7,551,172 B2 | 6/2009 | Yaron et al. |
| (Continued) | | |

FOREIGN PATENT DOCUMENTS

| CN | 102609973 A | 7/2012 |
| CN | 103914876 A | 7/2014 |
| EP | 2 194 508 A1 | 6/2010 |
| WO | 2008/147561 A2 | 12/2008 |
| WO | 2013/053438 A2 | 4/2013 |

OTHER PUBLICATIONS

Zeisl, Bernhard, Kevin Koser, and Marc Pollefeys. "Automatic registration of RGB-D scans via salient directions." Proceedings of the IEEE international conference on computer vision. 2013.*

(Continued)

*Primary Examiner* — Zhengxi Liu
(74) *Attorney, Agent, or Firm* — Maschoff Brennan

(57) ABSTRACT

Some embodiments of the invention pertain to a method for visualizing surface data and panorama image data in a three-dimensional scene. In some embodiments, the method may include providing a map view mode and a panorama view mode to a user. In some embodiments, the map view mode and/or the panorama view mode may include a multitude of surface tiles representing features of the three-dimensional surface, and may be referenced relative to a coordinate reference system. In some embodiments, the panorama image data may be associated with at least one panorama image and may include panorama position data describing a position relative to the coordinate reference system. In some embodiments, the map view mode may include visualizing surface data of at least a part of the representation of the three-dimensional surface as perceived from a map viewpoint.

35 Claims, 10 Drawing Sheets

(56) References Cited

U.S. PATENT DOCUMENTS

| | | | |
|---|---|---|---|
| 9,361,731 B2 | 6/2016 | Kim | |
| 2004/0027344 A1* | 2/2004 | Ohto | G06F 17/5004 345/419 |
| 2006/0206866 A1* | 9/2006 | Eldrige | G05B 15/02 717/122 |
| 2008/0253685 A1* | 10/2008 | Kuranov | G06T 3/4038 382/284 |
| 2009/0138811 A1* | 5/2009 | Horiuchi | G06F 3/04842 715/768 |
| 2009/0237396 A1* | 9/2009 | Venezia | G06T 19/00 345/419 |
| 2009/0240431 A1* | 9/2009 | Chau | G01C 21/3647 701/532 |
| 2010/0009809 A1* | 1/2010 | Carrington | A63B 71/0622 482/4 |
| 2011/0032145 A1* | 2/2011 | Hansen | G01C 21/3679 342/357.34 |
| 2011/0279446 A1* | 11/2011 | Castro | G01C 21/20 345/419 |
| 2013/0335446 A1* | 12/2013 | Piippo | G06F 3/04815 345/633 |
| 2014/0218354 A1* | 8/2014 | Park, II | G06T 3/4038 345/419 |
| 2014/0285523 A1 | 9/2014 | Gruenler et al. | |

OTHER PUBLICATIONS

Kumara, W. G. C. W., Shih-Ming Chang, and Timothy K. Shih. "Automatic panorama generation from a video with dynamic background." Advances in ICT for Emerging Regions (ICTer), 2013 International Conference on. IEEE, 2013.*

Author unknown, "360 panorama in 3ds Max tutorial", published on May 24, 2010, retrieved from http://renderstuff.com/360-panorama-3dsmax-tutorial-133/ on Aug. 16, 2018.*

Partial European Search Report dated Jun. 1, 2015 as received in Application No. EP 14184275.

"Creating virtual 360 Panorama", computer graphics tutorial, Accessed at https://web.archive.org/web/20101017082227/http://renderstuff.com/creating-virtual-360-panorama-cg-tutorial, Accessed on Aug. 14, 2015, pp. 10.

Google Maps, "Automatic Streetview transition in Google Maps v3", Retrieved on: Aug. 20, 2015.

Google Developers, "Street View Service", Retrieved on: Aug. 19, 2015.

Wikipedia, the free encyclopedia, "Hidden surface determination", Retrieved on: Aug. 19, 2015.

EP Search Report dated Aug. 27, 201 in application No. 14184275.7-1502.

* cited by examiner

METHOD FOR VISUALISING SURFACE DATA TOGETHER WITH PANORAMA IMAGE DATA OF THE SAME SURROUNDING

FIELD OF THE INVENTION

Some embodiments of the present invention pertain to a method of rendering data describing a surface of a given surrounding and data describing a panorama image of the same surrounding, and of visualising the data together on the same display.

BACKGROUND

Rendering is the process of generating an image from a model such as a three-dimensional terrain model by means of a computer programme. The three-dimensional terrain model to be rendered can be a grid containing elevation data, such as a Digital Elevation Model (DEM), a Digital Surface Model (DSM) or a Digital Terrain Model (DTM). The digital model may comprise data of a limited area, such as a model of a particular city or landscape, as well as a model of a continent or even a complete planet.

Computer rendering of three-dimensional terrain images is generally known from prior art: U.S. Pat. No. 7,551,172 B2 discloses a method for sending information representing three-dimensional images over a network, and U.S. Pat. No. 6,496,189 B1 discloses a method and apparatus for displaying images of an area as seen from an interactively chosen viewpoint on a remote device.

When visualizing three-dimensional terrain data of a given surrounding in a computer, for instance in a bird's view perspective, it would be desirable to simultaneously visualize available panorama images of the same surrounding, as this could provide a more convenient and detailed perception of the local conditions to a user.

US 2013/0335446 A1 discloses a method for rendering a portion of a map together with a field-of-view image from a user-selected point of the map. Other known applications such as "Google Street View" or "Bing Streetside" allow the user entering a panorama view mode from a map view mode, showing a panorama image of the same surrounding.

However, it would be advantageous to be able to watch the panorama image or a preview thereof together with the map view and oriented to a coordinate reference system of the map.

SUMMARY

Some embodiments of the present invention provide an improved method for visualizing surface data and panorama image data of a three-dimensional scene together.

Some embodiments of the invention provide such a method for 360° panorama images, wherein depending on the user's present view on the surface, different parts of the panorama image are visible.

Some embodiments of the invention provide such a method wherein information from the panorama image can be displayed in the representation of the surface and vice versa.

Some embodiments of the invention provide such a method with an intuitive switching between a map view and a panorama view.

Some embodiments of the invention are the provisions of a computer programme product for execution of said method.

Some embodiments of the invention pertains to a method for visualizing surface data and panorama image data in a three-dimensional scene, the method comprising providing a map view mode and a panorama view mode to a user. The surface data is associated with a representation of a terrain surface, comprises a multitude of surface tiles and/or a multitude of surface objects representing features of the terrain surface, and is referenced relative to a coordinate reference system. The panorama image data is associated with at least one panorama image, particularly a 360° panorama image, and comprises panorama position data describing a position relative to the coordinate reference system. The map view mode comprises visualizing surface data of at least a part of the representation of the terrain surface as perceived from a map viewpoint, and the panorama view mode comprises visualizing panorama image data of at least a part of the panorama image as perceived from a panorama viewpoint. According to the invention, the map view mode comprises displaying at least one panorama element, which comprises a plurality of display surfaces for visualizing panorama image data during the map view mode and is positioned relative to the representation of the terrain surface according to the panorama position data. The method comprises displaying the panorama image or a panorama preview image on the display surfaces, the panorama preview image being based on the panorama image data and corresponding to at least a part of the respective panorama image, depending on the current position and orientation of the panorama element relative to the map viewpoint.

In some embodiments of the method according to the invention, the panorama image comprises at least one panorama object that represents a feature of the terrain surface and is linked with at least one surface tile and/or surface object that represent the same feature.

In one embodiment, the panorama image data comprises depth data, in particular a depth map, indicating a distance from a current map or panorama viewpoint to at least one panorama object depicted in the panorama image, in particular to a multitude of panorama objects.

In another embodiment, in the panorama view mode, for at least one panorama object that is depicted in the panorama image, a position relative to the coordinate reference system is determined based on a position of the linked at least one surface tile and/or surface object relative to a coordinate reference system, and/or based on the depth data and on the panorama position data, wherein surface tiles and/or objects representing features of the terrain surface, which are positioned between a panorama object in the panorama image and the panorama viewpoint, are displayed.

In another embodiment, in the map view mode, a texture of surface tiles and/or objects representing features of the terrain surface is assigned from the panorama image data, based on the depth data.

In a further embodiment, in the map view mode and/or in the panorama view mode, object data of the linked surface tile and/or surface object is displayed together with the panorama object, the object data particularly comprising address or location information associated with the feature.

In another embodiment, the method according to the invention comprises identifying in the panorama image data gaps that comprise no image data, and/or obstructed parts that comprise image data of the camera assembly which has been used for taking the panorama image, or of a user of the camera assembly. According to this embodiment, the method further comprises replacing, in the map view mode and/or in the panorama view mode, the identified data gaps and/or obstructed parts by rendering a substitute part of the representation of the terrain surface. Particularly, the bottom face of the panorama element at least partially displays a substitute part, and/or in the panorama view mode a substitute part is displayed.

In another embodiment of the method according to the invention, the panorama element is basically prismatic, wherein the panorama element comprises a plurality of side faces, a top face and a bottom face, wherein the display surfaces are the inside surfaces of at least two, in particular three, side faces and of a bottom face.

In another embodiment, the panorama element comprises a cube map, wherein the display surfaces are the inside surfaces of the four side faces and of the bottom face. Depending on the field of view and orientation of the map viewpoint, from one to six faces of the cube map may be displayed simultaneously. Particularly, one or two faces are not displayed when they are facing towards the map viewpoint, and the top face is not displayed. In particular, each displaying surface comprises a plurality of displaying tiles for displaying parts of the panorama preview image.

In one embodiment of the method according to the invention, the panorama element maintains its orientation relative to the representation of the surface throughout the map view mode. Particularly, each display surface is assigned a part of the panorama preview image which it displays as long as the respective display surface visible, independent of the current position and orientation of the panorama element relative to the map viewpoint, and which of the display surfaces is currently visible depends on the current position and orientation of the panorama element relative to the map viewpoint.

In another embodiment of the method according to the invention, the panorama element maintains its orientation relative to the map viewpoint throughout the map view mode. Particularly, the same display surfaces of the panorama element are constantly visible, and which part of the panorama preview image is currently displayed on these display surfaces depends on the current orientation of the panorama element relative to the coordinate reference system.

In another preferred embodiment of the method according to the invention, in the map view mode, the user is enabled to move the map viewpoint relative to the panorama element. According to this embodiment, a resolution and/or detail level of the panorama preview image depends on a distance of the panorama element to an actual position of the map viewpoint, and/or the panorama view mode is started by approaching or entering the panorama element with the map viewpoint.

In one embodiment of the method according to the invention, in the map view mode, backface culling and/or occlusion culling are used in such a way that hidden tiles of the terrain surface that are hidden from the map viewpoint by the panorama element are not rendered, external surfaces of the panorama element are not rendered, and/or hidden parts of the panorama preview image currently not being displayed on any one of the display surfaces are not rendered.

In another embodiment of the method according to the invention, at least one of the display surfaces is partially transparent, wherein each of the display surfaces is assigned a certain degree of transparency, and/or switching from the map view mode to the panorama view mode or from the panorama view mode to the map view mode comprises alpha blending, wherein the representation of the terrain surface is visible behind the panorama image and/or behind the panorama preview image.

In a further embodiment of the method according to the invention, the map view mode comprises concurrently visualizing a multitude of panorama elements, wherein whether a panorama element of the multitude is visible or hidden depends on its distance to the map view point; and/or the user is enabled to decide for each of the panorama elements whether it is visible or hidden. Particularly, panorama element icons are provided in the map view mode to symbolize the location of hidden panorama elements, the panorama element icons being displayed on the representation of the terrain surface, positioned according to the respective panorama position data, and/or the panorama elements provide a hiding functionality, allowing the user to hide the respective panorama element, the hiding functionality particularly being provided as a selectable hiding key element and/or as a selectable option of a drop down menu of the respective panorama element.

In another embodiment of the method according to the invention, the panorama image shows the interior of a building or a model of the interior of a building, the map view mode comprises visualizing a model of said building as a surface object, and the selection of the model by a user triggers the visualizing of a respective panorama element.

In another embodiment of the method according to the invention, the panorama data comprises video data, the video data is related to a video stream comprising a multitude of panorama images, wherein the video stream is a 360° video stream and/or a real time video stream, and the panorama element displays a video stream of a multitude of panorama preview images, particularly a real time video stream.

In a further embodiment of the method according to the invention, the terrain surface is a three-dimensional surface, in particular a part of the Earth's surface. In a further embodiment, the representation of the terrain surface is a map, an aerial image or a combination of a map and an aerial image, in particular drawn in a bird's eye perspective. In a further embodiment, the panorama position data comprises latitude and longitude values, and/or values describing height, heading, roll, pitch, yaw, northing and/or easting of the panorama image. In a further embodiment, the surface data comprises elevation data describing a geometry of the three-dimensional surface, and an elevation of the panorama element is computed depending on the elevation data.

The invention also relates to a computer programme product, comprising programme code which is stored on a machine-readable medium, or being embodied by an electromagnetic wave comprising a programme code segment, and having computer-executable instructions for providing a map view mode and a panorama view mode of a method according to the invention.

BRIEF DESCRIPTION OF THE DRAWINGS

The invention in the following will be described in detail by referring to some embodiments that are accompanied by figures, in which.

DETAILED DESCRIPTION

Figure 1:
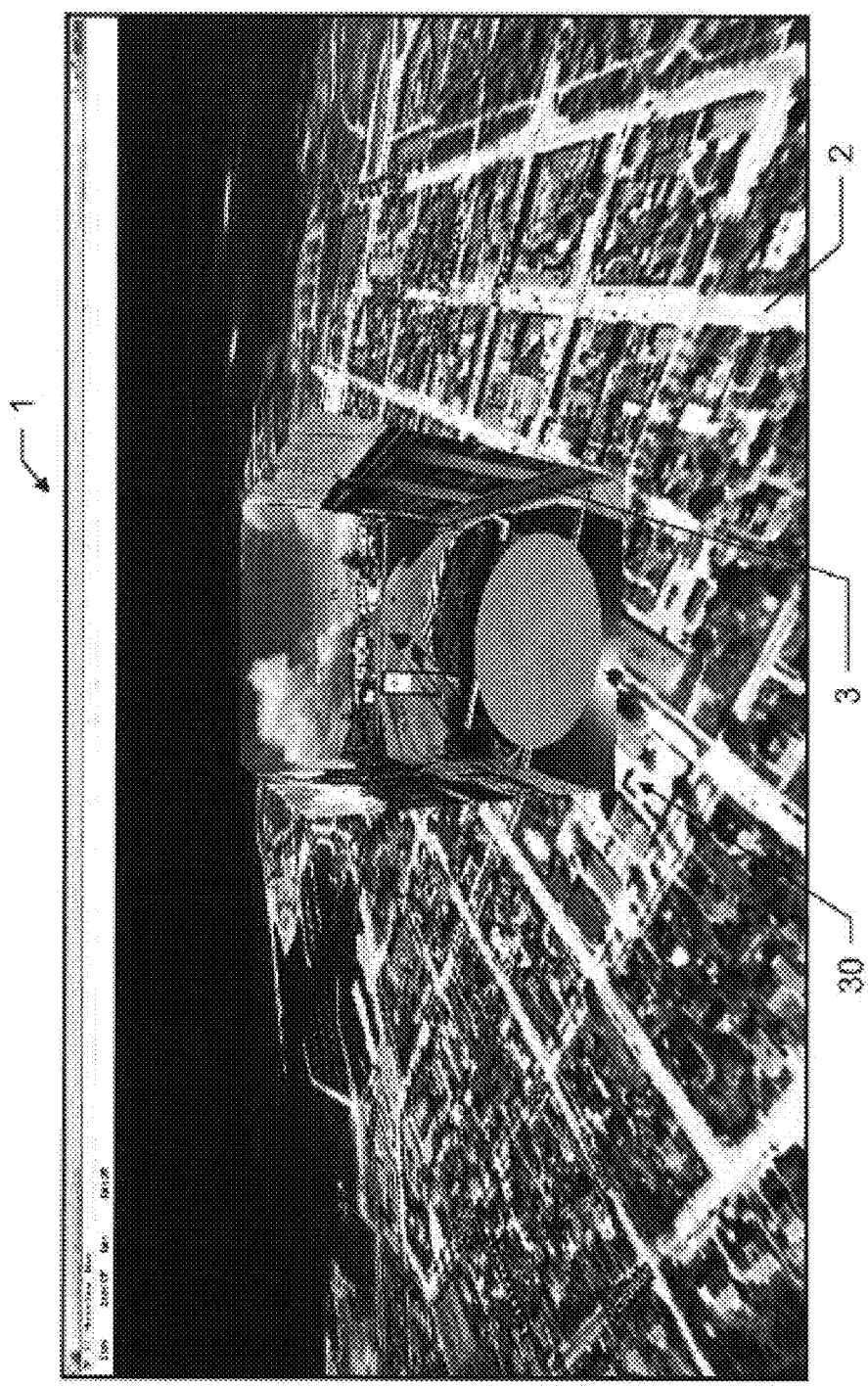
FIG. 1 shows an example visual output of a map view mode of a method according to the invention, showing a representation of a terrain surface of a surrounding and a preview of a panorama image of the same surrounding.

FIG. 1 shows an example of a visual output 1 of the map view mode of a method according to the invention. It shows a representation of a three-dimensional terrain surface of a surrounding as a bird's eye view map 2 and a panorama element 30 displaying a preview image 3 of a panorama image of the same surrounding.

The depicted panorama element 30 comprises a cube-map with imagery in all of the cube's six faces. It is used for displaying a representation of an environment in all orientations, in particular a preview 3 of a panorama image or the panorama image itself. The panorama element 30 is displayed in the same 3D scene as the map 2, using the same coordinate reference system for positioning the panorama element 30 on the map 2. To achieve this, the provided panorama data comprises panorama position data, i.e. at least two-dimensional location (latitude and longitude or northing and easting) and optionally height, heading, roll, pitch. When the panorama image is known to be located on or near the ground, a height of the panorama optionally can be computed from the 3D map geometry.

Figure 2:
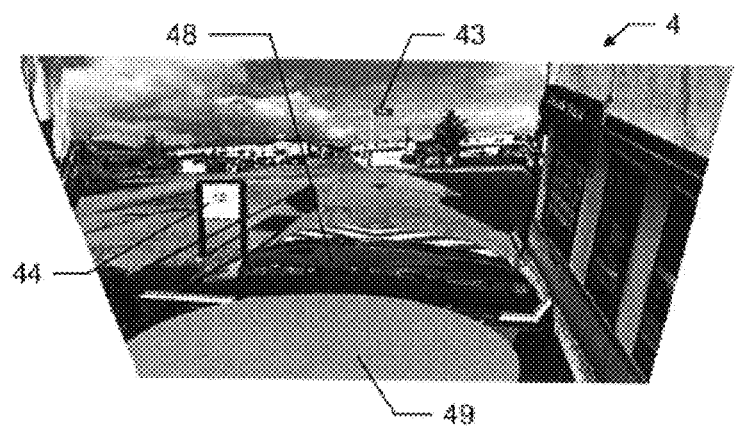
FIG. 2 shows an example visual output of a panorama view mode of a method according to the invention.

FIG. 2 shows a section of the corresponding 360° panorama image 4 as viewed in an example panorama view mode according to the invention. In the panorama image 4, a number of objects of the surrounding (panorama objects 43,44) are visible, as well as obstructed parts 48 of the image, i.e. those parts of the image that depict parts of a the camera assembly that has been used for taking the image— in this example parts of the car on which the camera has been mounted. A part without any image data (data gap 49) is also visible. The user may choose to view a certain section of the panorama image 4 by zooming in and out or turning the viewing direction by suitable input means of the used computer system, e.g. by using arrow keys, a computer mouse, or—when using a mobile device with a touch-screen and an accelerometer or gyroscope—moving the device to the desired direction and/or performing typical motions on the touch-screen. Optionally, it is possible to display the viewpoint position of nearby further panorama images in the panorama image 4, a compass or—e.g. in a corner of the visual output—a miniature overview map indicating the present viewing direction. In particular, these options may be switched on and off by the user.

Figure 3:
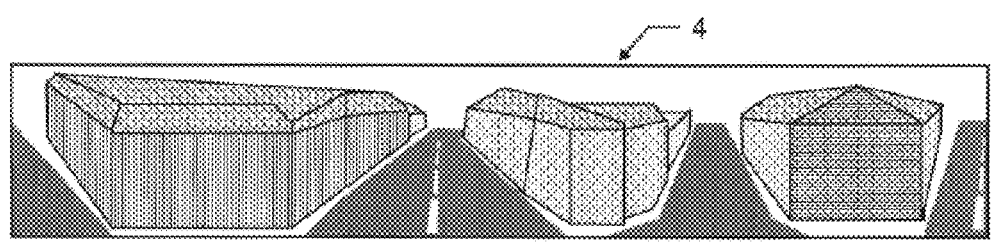
FIG. 3 shows a panorama image.
Figure 4:
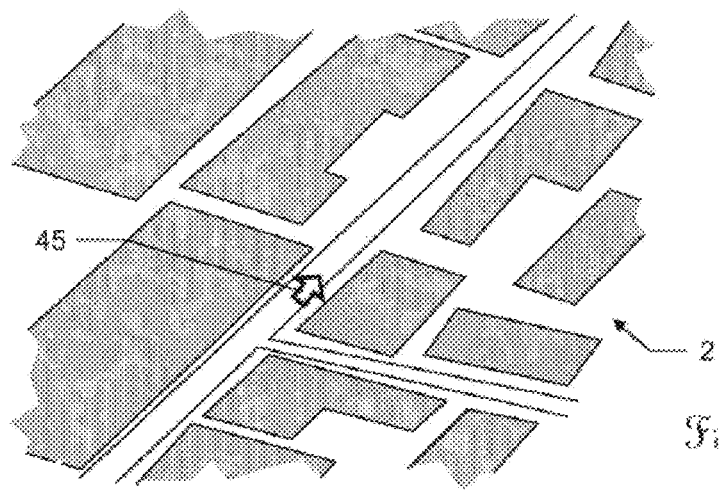
FIG. 4 shows a representation of a terrain surface and the position and orientation of the panorama image of FIG. 3.

FIG. 3 shows a panorama image 4 in a more abstract way. and in FIG. 4, a representation of a three-dimensional surface 2 is depicted. According to the invention, the panorama image 4 is based on image data, and the representation of the three-dimensional surface 2 is based on surface data. The surface data is related to a coordinate reference system and the image data comprises panorama position data describing a position relative to the coordinate reference system of the surface data. In FIG. 4, a position and orientation of the panorama image 4 with respect to the representation of the three-dimensional surface 2 is represented by the arrow 45.

The panorama image 4 can be the result of image stitching from a plurality of single images or been taken by a single 360° or photosphere camera. Optionally, the panorama image 4 can be a stereoscopic 3D image, for instance anaglyphic. The panorama images 4 can be taken of certain points of interest or in constant intervals while travelling along roads, the panorama camera e.g. being mounted on top of a car (as shown in FIGS. 1 and 2) or a bicycle. Alternatively, the panorama images 4 can be produced by fixed cameras, such as panorama webcams.

The panorama image 4 can optionally be a part of a video stream, so that the panorama image displays a preview of this video stream. This video stream can be a real time video, particularly a live video stream, e.g. comprising live images from a panorama surveillance camera.

Alternatively, a plurality of panorama images of the same surrounding but taken at different points of time are available, the time particularly being selectable by a user. For instance, this can be useful to monitor the progress of a construction site.

Figure 5A:
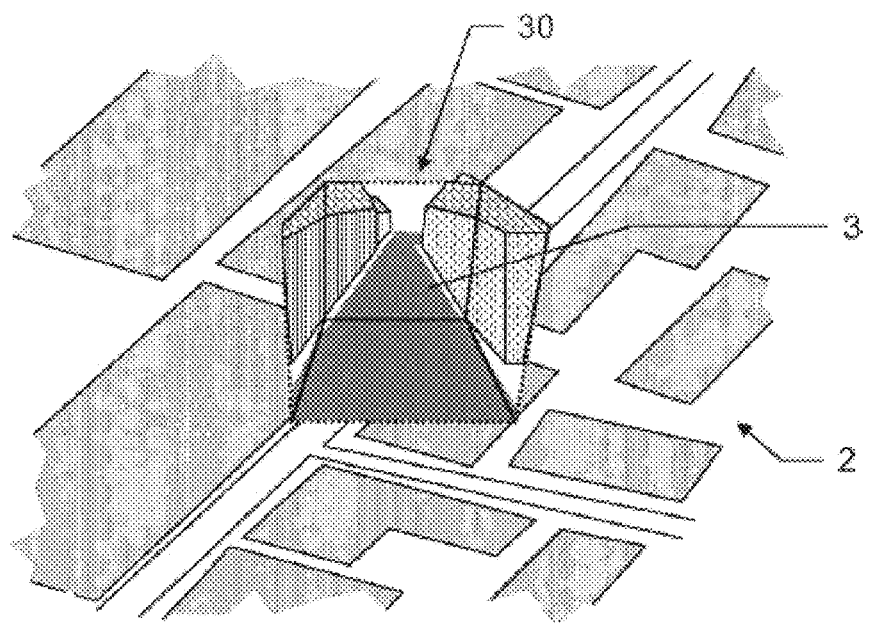
FIGS. 5a-b show the representation of the terrain surface of FIG. 4 together with a panorama element displaying a preview of the panorama image of FIG. 3.
Figure 5B:
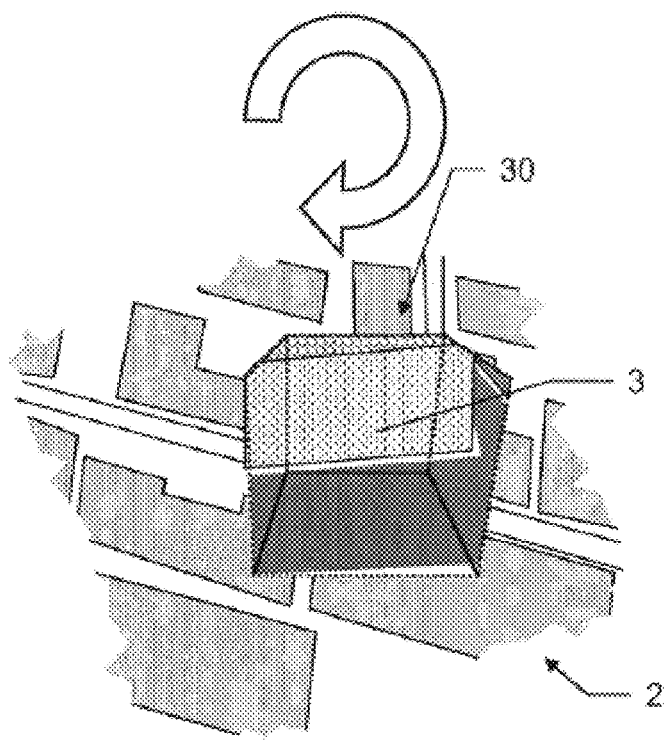

FIG. 5a shows the representation of the three-dimensional surface 2 of FIG. 4, wherein a panorama element 30 is placed on top of the representation according to the panorama position data. The panorama element 30 displays a preview image 3 that corresponds to a part of the panorama image 4 of FIG. 3. The displayed preview image depends on a position and orientation of the panorama element 30 relative to the current viewpoint of the user. In FIG. 5b the viewpoint has changed. The user looks on the same representation of the three-dimensional surface 2 and the same panorama element 30 as in FIG. 5a but from a different direction. Therefore, the displayed preview image 3 corresponds to a different part of the panorama image.

Figure 6A:
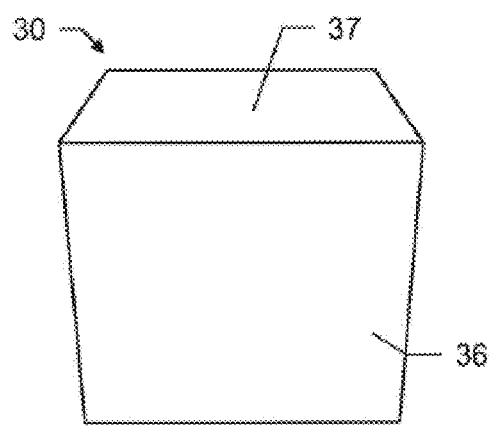
FIGS. 6a-b show a cubic panorama element.
Figure 6B:
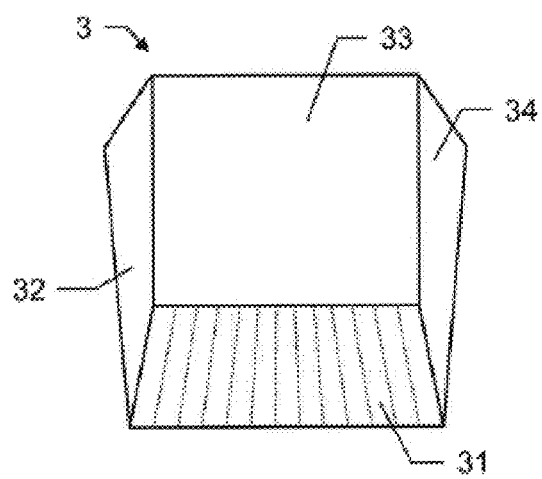

In FIGS. 6a and 6b a first example embodiment of a panorama element 30 is depicted. Depending on the field of view and orientation of the map viewpoint, between one and six faces 31,32,33,34,36,37 of the cube map are displayed simultaneously. Here, the panorama element 30 is a cube that is oriented towards a user's viewpoint in such a way that the top face 37 and one of the four side faces, i.e. the front face 36 are directed to the viewpoint. Though, these faces 36,37 are not visualized but only the inside surfaces of the bottom face 31 and of the three remaining side faces 32-34, which are used for displaying the preview image.

Figure 7:
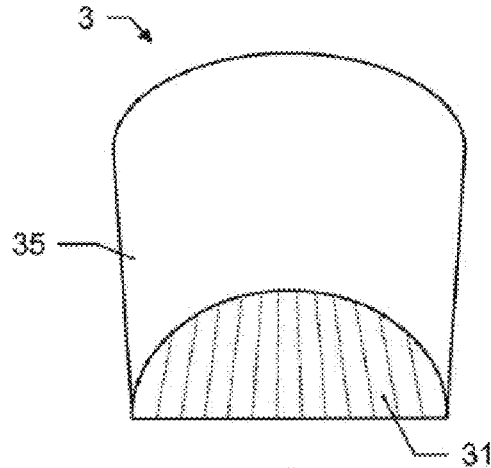
FIG. 7 shows a half-cylindrical panorama element.

In FIG. 7 an alternative embodiment of a panorama element 30 is depicted. This element is half-cylindrical instead of cubic. The inside surfaces for displaying the preview image therefore comprise those of the bottom face 31 and of a curved face 35. Though not shown here, many other shapes are possible, particularly prismatic elements of many kinds, e.g. pentagonal, or octagonal.

Figure 8:
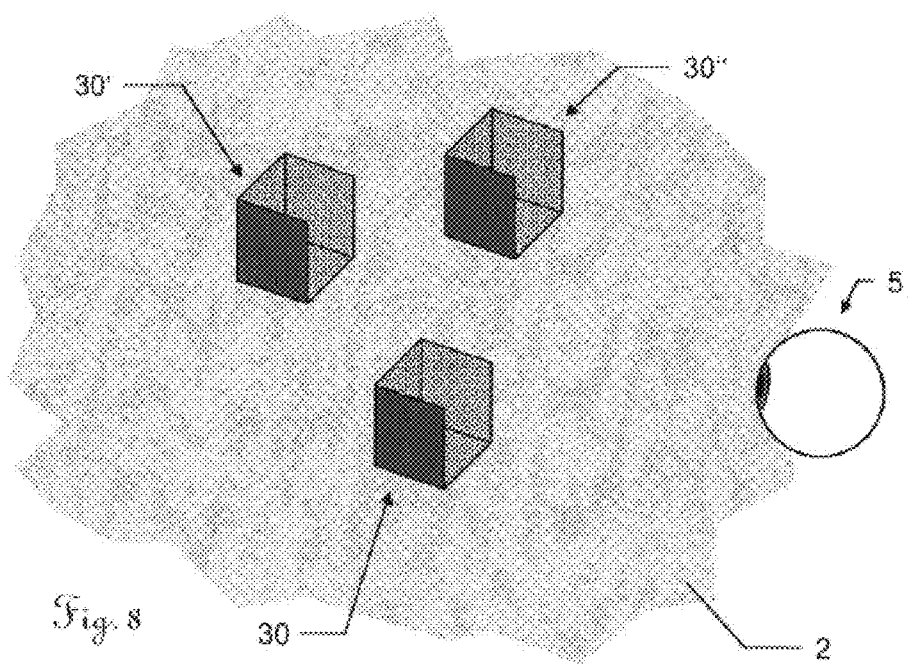
FIG. 8 shows a representation of a terrain surface with three panorama elements being oriented towards the viewpoint of the user.

FIG. 8 shows a representation of a three-dimensional surface 2 (here indicated in a simplified manner by the dotted area) with three panorama elements 30,30',30" being placed on top of the representation according to the respective panorama position data. The three panorama elements 30,30',30" are oriented towards the user's viewpoint (virtual camera 5), so that four displaying surfaces of each panorama element are visible to the user.

Alternatively, the orientation of the panorama elements 30,30',30" can be fixed relative to the surface, so that, depending on the viewpoint's 5 position relative to a panorama element, the number of displaying surfaces that are visible at the same time may vary. In case of a cubic panorama element, the number of displaying surface could thus be three or four (including the bottom face), depending on whether a fourth inside surface of the cube would be visible and/or whether an outside surface would obstruct the view on one of the inside surfaces.

Figure 9A:
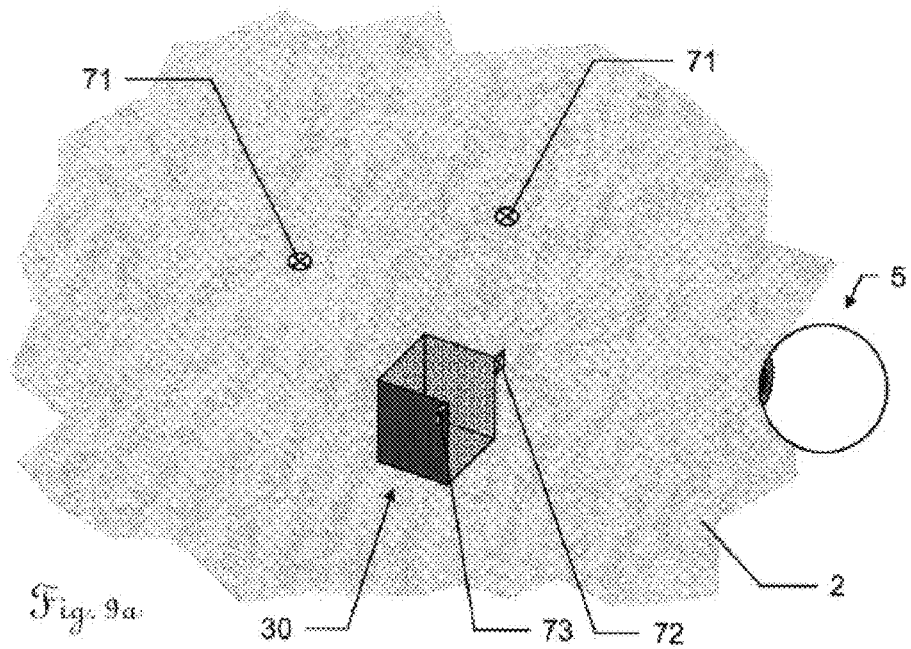
FIGS. 9a-b show means that enable the user to hide or display the panorama elements.
Figure 9B:
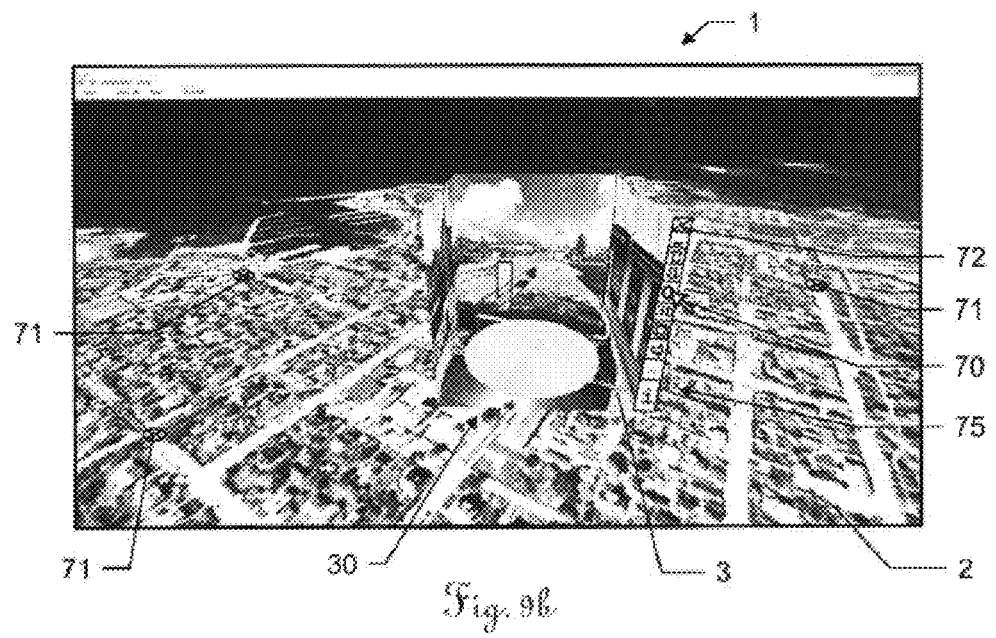

Optionally, the user may select which panorama elements are to be displayed. This is shown in FIGS. 9a and 9b. In one embodiment, initially only the representation of the three-dimensional surface 2 is rendered, the positions of panorama images being indicated by icons 71 on the surface. The user may then click on one of these icons 71 and the respective panorama element 30 will be displayed. Likewise, the displayed panorama elements may be unselected in order to be no longer displayed, e.g. by a right click on the element with the mouse. Alternatively, each panorama element 30 comprises an exit icon 72 and/or a drop down menu 73, as depicted in FIG. 9a.

In an optional embodiment, also the look of the panorama element 30 can be user-selectable, e.g. by clicking on an icon or selecting an option from the drop down menu 73. For instance, means can be provided that allow the user to select the size of the panorama element 30, whether the panorama element 30 should be cubic or half-cylindrical, whether it should be oriented relative to the viewpoint or relative to the coordinate reference system, or whether it should be opaque or partially transparent. Switching to the panorama view mode might be performed by selecting the respective option from the drop down menu or e.g. simply by double clicking on the panorama element 30.

FIG. 9b shows the visual output 1 of the map view mode of a method according to the invention. A panorama element 30 comprising a menu 75 is provided. The positions of further panorama elements that are currently hidden are indicated by icons 71 on the map 2. The user is enabled to select with a cursor 70 menu options from the menu 75. As depicted here, these may comprise the options of hiding the panorama element (exit icon 72), of hiding the menu 75, of changing the size of the panorama element, of switching to the panorama view mode, of displaying the preview image 3 as a stereoscopic 3D image, of making the panorama element 30 transparent, of moving the field-of-view to the next panorama element, and of displaying information about the panorama image data.

Figure 10:
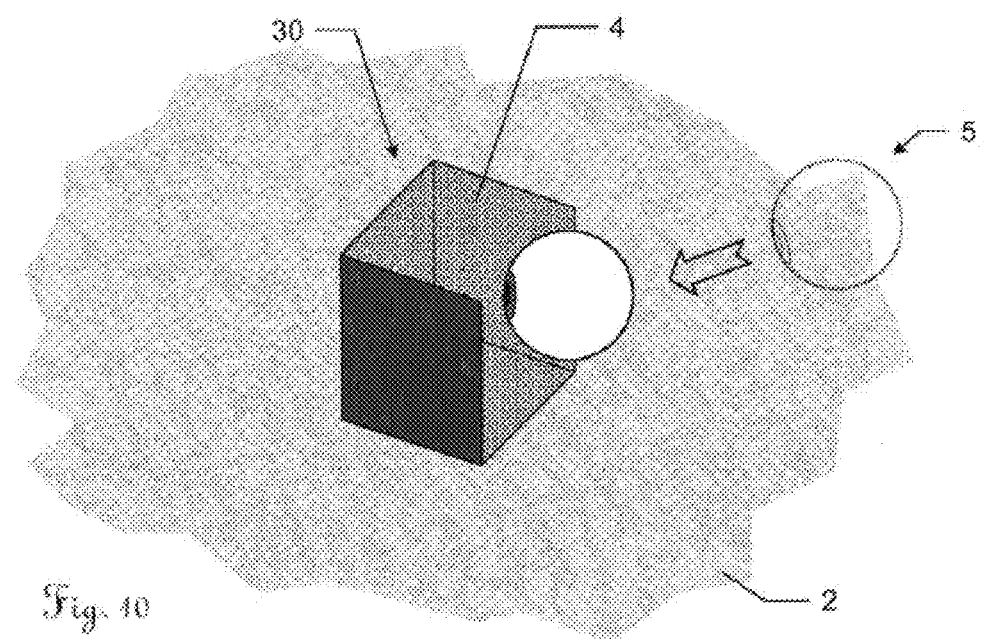
FIG. 10 illustrates the approaching of a panorama element for switching to the panorama mode.

FIG. 10 shows the approaching of a panorama element 30 by the viewpoint (virtual camera 5). As it is known from prior art, the user is enabled to move the virtual camera 5 relative to the surface 2. As the panorama element 30 is positioned on the surface according to the coordinate data, the virtual camera 5 is thus also movable relative to the panorama element 30, so that a user can approach the panorama element 30 when moving over the surface. When the virtual camera 5 is close enough and directed towards the panorama element 30, the panorama image 4 will eventually fill the screen.

According to a preferred embodiment of the invention, approaching or entering the panorama element 30 triggers the switching from the map view mode to the panorama view mode. This means that the user enters the panorama view mode without any further action and then is enabled to watch the full 360° panorama by turning to the left or right.

Figure 11:
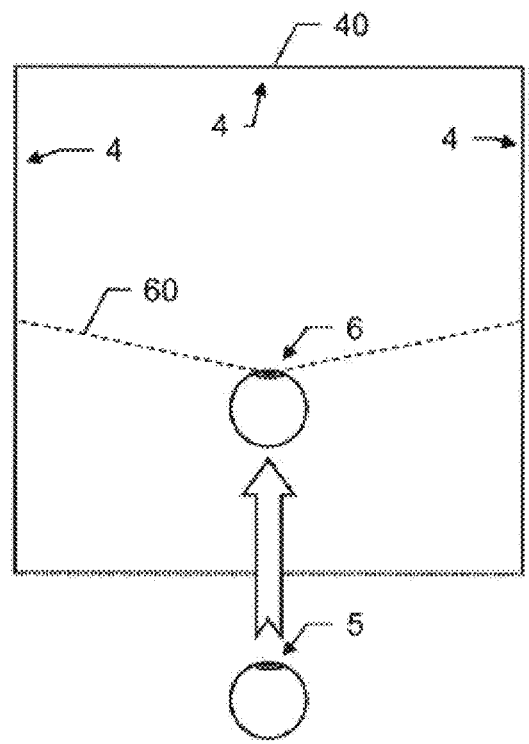
FIG. 11 illustrates the entering of a panorama element for switching to the panorama mode.
Figure 12:
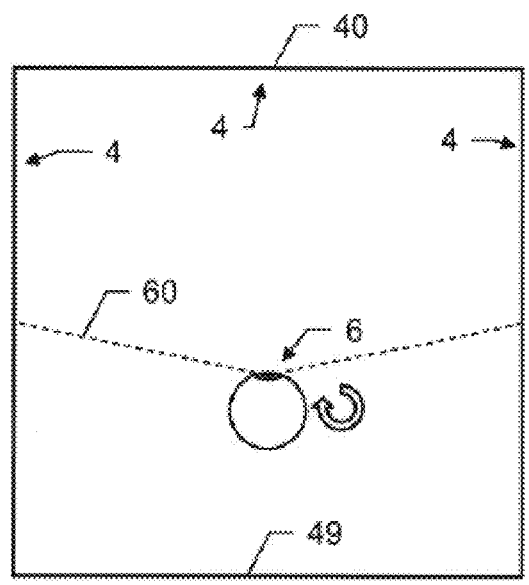
FIG. 12 shows the panorama view mode.

This is illustrated in FIG. 11 from a top view. A panorama element that is approached by the user's viewpoint of the map view mode (map viewpoint 5) is then automatically entered and the viewpoint 5 of the map view mode becomes the viewpoint of the panorama view mode (panorama viewpoint 6). The panorama viewpoint 6 has a viewing angle 60; those parts 40 of the panorama image 4 that lie within the viewing angle 60 are then displayed to the user. As illustrated in FIG. 12, the user is enabled to turn the viewpoint 6 to watch other parts of the panorama image 4. Those parts 49 of the panorama image presently not visible need not be rendered.

The switching between the map view mode and the panorama view mode may comprise alpha blending. For instance, when switching from the panorama view mode to the map view mode, a movement of the panorama viewpoint 6 away from the panorama image 4 can be animated, the panorama image becoming transparent, thus revealing the view on the surface.

Figure 13:
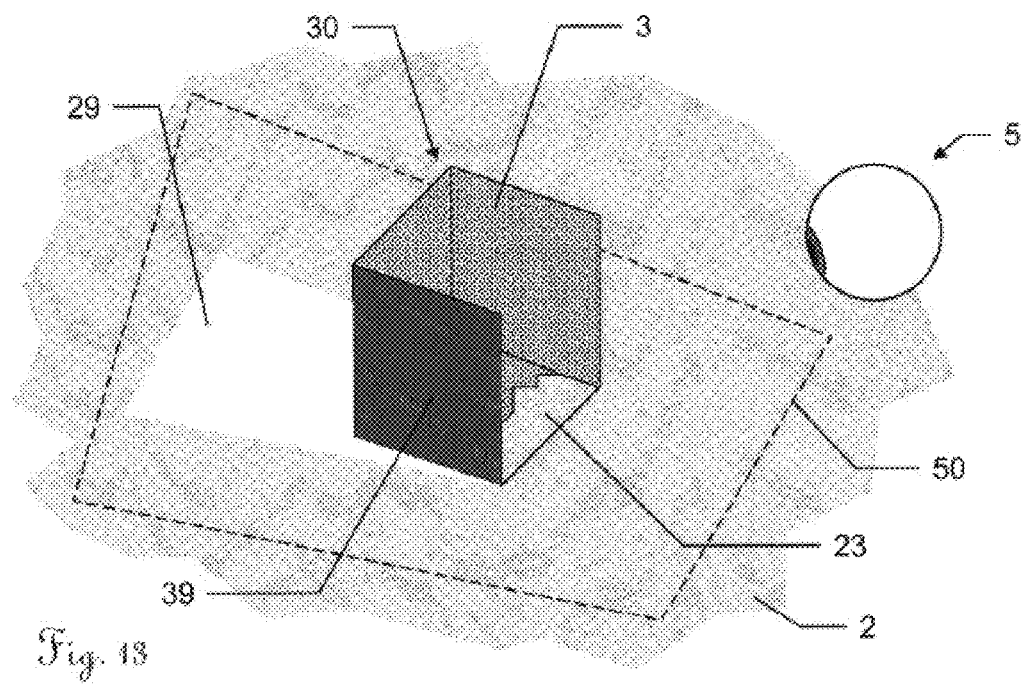
FIG. 13 shows examples for culling when visualizing the panorama element on the surface.

FIG. 13 illustrates which parts of a representation of a three-dimensional surface 2 and of a panorama element 30 need not be rendered in the map-view mode. First of all, the viewpoint 5 has a field of view 50, and parts of the surface outside of the field of view 50 need not be rendered. Next, the panorama element 30 obstructs the view to a part 29 of the surface 2 that would normally lie within the field of view 50. Finally, no outer surface 39 of the panorama element 30 is ever visible from the viewpoint 5, so that these need not be rendered either.

Alternatively, all or some of the faces of the panorama element 30 can be partially transparent in order to allow the user to watch the otherwise hidden parts 29 of the surface 2 or the otherwise hidden parts of the panorama element. This also allows displaying the panorama preview image 3 on all of the display surfaces at the same time. Particularly, each of the display surfaces 31-35 is assigned a certain degree of transparency.

Certain parts of the inside surfaces which normally would display parts of the preview image 3 may instead display a part 23 of the representation of the surface 2. For instance, if there are gaps in the image data of the panorama image 4, those parts of the surface 2 that would be visible without the panorama element 30 may be displayed. Also, if certain areas of the panorama image 4 show parts of the camera appliance (see FIG. 2); these areas may be replaced with parts of the surface representation. This will often apply to the bottom face of the panorama element 30. Alternatively, these parts can be partially transparent, thus showing both the panorama image 4 and the surface 2.

Figure 14:
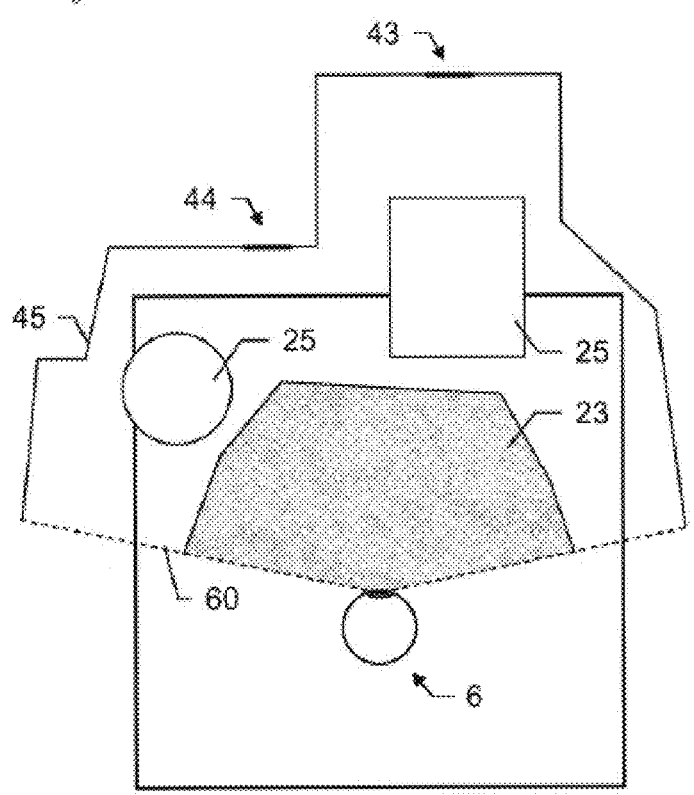
FIG. 14 shows the rendering of surface data in the panorama view mode.

Each panorama image may contain separate data indicating distance from the camera to the pixel on screen. This data may be in a depth map where each pixel describes depth instead of colour. Depth information in the panorama may also be extracted from the terrain data or building geometry in the map. FIG. 14 shows the use of depth data in the panorama image data for displaying parts 23 or objects 25 of the representation of the surface in the panorama view mode or in the panorama preview. Line 45 represents a depth map of the panorama image. Panorama objects 43,44 depicted in the panorama image are assigned a depth value describing their distance to the viewpoint 6.

From the depth data and the panorama coordinate data a position of the panorama objects relative to the coordinate reference system can be calculated. Objects 25 or tiles of the representation of the surface that lie between the viewpoint 6 and these objects 43,44 can therefore be displayed in front of these objects 43,44. Also, as described above for the panorama element, gaps in the image data or areas of the panorama image 4 that show parts of the camera appliance may be identified and be replaced with parts 23 of the surface representation. The objects 25 or tiles of the representation of the surface, alternatively, can be displayed partially transparent.

Figure 15:
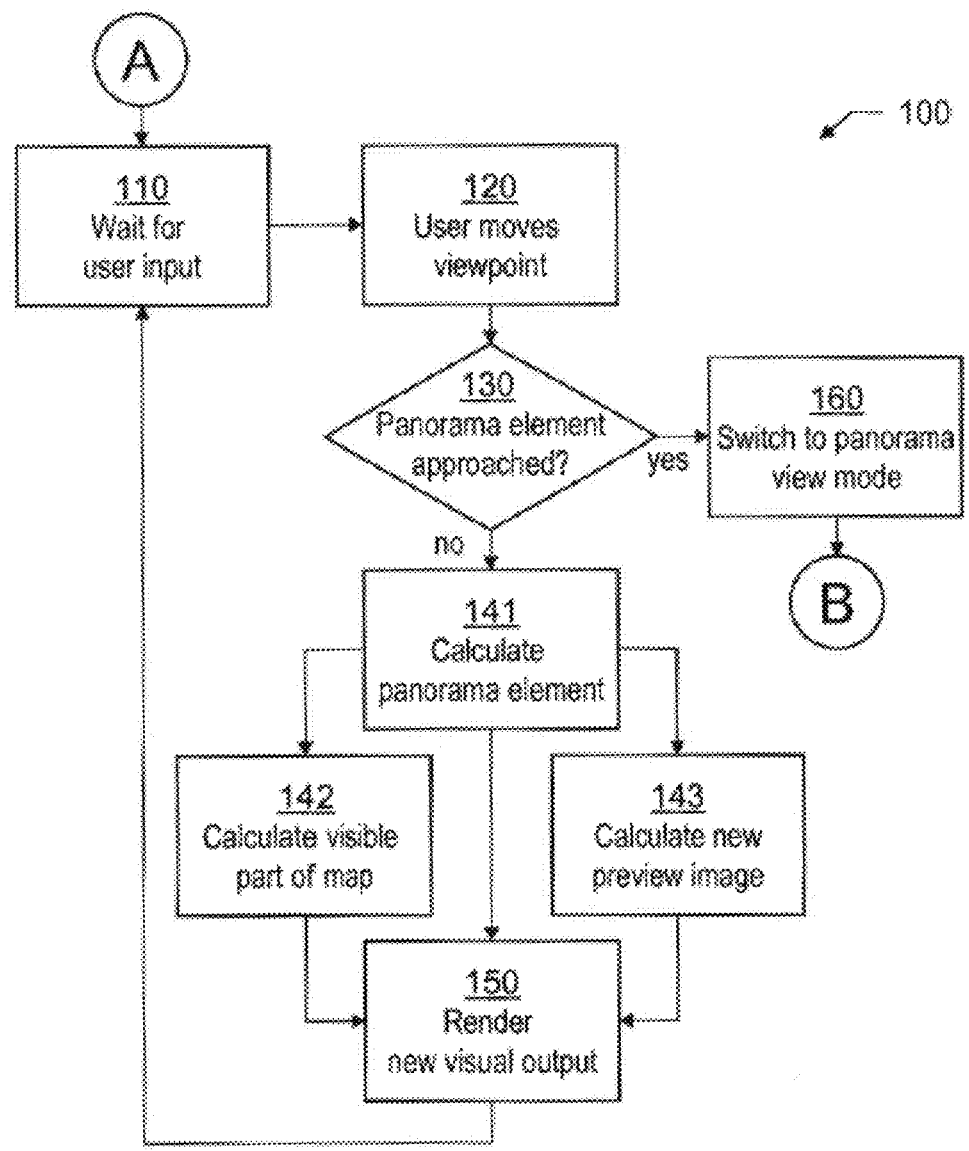
FIG. 15 shows a flowchart illustrating the effects of a user input during the map view mode.

FIG. 15 shows a flowchart that illustrates—in a strongly simplified manner—the effects of a user input during the map view mode 100. After the start of the map view mode, a user input is waited for 110. In this example, the user input is a movement 120 of the viewpoint relative to map and panorama element(s). This triggers the examination 130 of whether the viewpoint has approached or even entered the panorama element. If the result is that the distance between the panorama element and the viewpoint has fallen below a pre-defined threshold, this triggers the switching 160 to the panorama view mode for the respective panorama image (B).

Otherwise, rendering the visual output from the new viewpoint is prepared by calculating what has to be displayed. First, the size and orientation of the panorama element—adjusted to the new viewpoint—are calculated 141. Also, all other applicable options regarding the appearance of the panorama element are considered, e.g. which faces are displayed or which transparency level each face should have at the new distance from the viewpoint.

Next, it is calculated 142 which part of the terrain surface is visible from the new viewpoint, thereby also taking into account, which parts are now occluded by the panorama element and which are no longer. Concurrently, the preview image that is to be displayed on the panorama element is calculated 143. Depending on the appearance of the panorama image and its distance and orientation relative to the viewpoint, the preview image will correspond to a certain part of the panorama image. Optionally, also a resolution level can be selected depending on the distance to the viewpoint and/or on the size of the panorama element.

Then, the new visual output is rendered 160 based on the above calculations and further user inputs are waited for 110. Obviously, also other user inputs are possible that lead to respective actions (some of them described above with respect to FIGS. 9a and 9b), but are omitted here for the sake of clarity.

Figure 16:
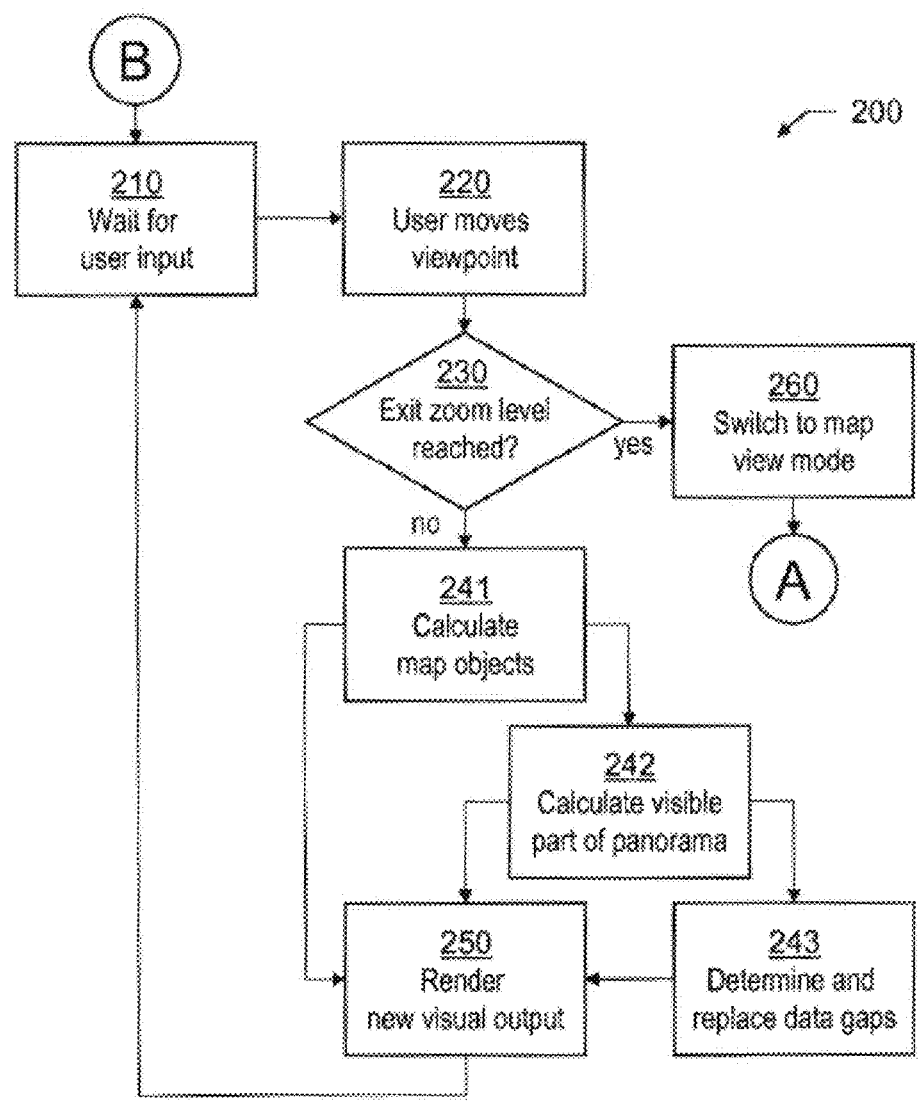
FIG. 16 shows a flowchart illustrating the effects of a user input during the panorama view mode.

FIG. 16 shows a flowchart that illustrates—in a strongly simplified manner—the effects of a user input during the panorama view mode 200.

After the start of the panorama view mode 200, particularly after the user has switched to the panorama view mode from the map view mode (A), the system waits for a user input 210. In this example, the user input is a movement 220 of the viewpoint, e.g. a turn of the field-of-view to the side or a zooming in or out of the image. This triggers the examination 230 of whether the viewpoint has reached or exceeded a pre-defined zoom-level for exiting the panorama element. If this zoom-level has been reached or exceeded, this triggers the switching back to the map view mode.

Otherwise, rendering the visual output of the panorama image from the new viewpoint is prepared by calculating what has to be displayed. First, if applicable for the new viewpoint, the position and orientation of map objects and/or tiles are calculated 241, based on the depth data of the panorama image data and depending on the single object's and/or tile's distance and orientation to the viewpoint.

Next, the part of the panorama image that is visible from the new viewpoint is calculated 242, thereby also taking into account, which parts are now occluded by the map objects and/or tiles. Afterwards, all data gaps, i.e. those parts of the panorama image without image data that are not already occluded by map objects and/or tiles are determined and replaced 243 by further map data, thus displaying a part of the representation of the terrain surface.

Then, the new visual output is rendered 260 and further user inputs are waited for 210.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for visualizing surface data and panorama image data in a three-dimensional scene, the method comprising providing a map view mode and a panorama view mode to a user, wherein:
   the surface data:
      is associated with a representation of a terrain surface,
      comprises a multitude of surface tiles and/or a multitude of surface objects representing features of the terrain surface, and
      is referenced relative to a coordinate reference system;
   the panorama image data:
      is associated with at least one 360° panorama image, and comprises panorama position data describing a position relative to the coordinate reference system;
   the map view mode comprises visualizing surface data of at least a part of the representation of the terrain surface as perceived from a map viewpoint; and
   the panorama view mode comprises visualizing panorama image data of at least a part of the 360° panorama image as perceived from a panorama viewpoint, wherein in the panorama view mode the user is enabled to turn a viewing direction to watch a full 360° panorama;
   the map view mode comprises displaying at least one panorama element, the panorama element being prismatic and:
      comprising a plurality of display surfaces for visualizing panorama image data during the map view mode, wherein the display surfaces are inside surfaces of at least two side faces and of a bottom face of the panorama element, the panorama element being positioned relative to the representation of the terrain surface according to the panorama position data,
   wherein the method comprises:
      switching from the map view mode to the panorama view mode and switching from the panorama view mode to the map view mode;
      displaying the 360° panorama image or a panorama preview image on the display surfaces, the panorama preview image being based on the panorama image data and corresponding to at least a part of the 360° panorama image, depending on the current position and orientation of the panorama element relative to the map viewpoint;

identifying in the 360° panorama image:
   data gaps that comprise no image data and
   obstructed parts that comprise image data of the camera assembly which has been used for taking the 360° panorama image or image data of a user of the camera assembly;
replacing, in the panorama view mode, the identified data gaps and obstructed parts by rendering and displaying a first substitute part of the representation of the terrain surface; and
replacing, in the map view mode, the identified data gaps and obstructed parts by a substitute part of the representation of the terrain surface, wherein the bottom face of the panorama element at least partially displays the substitute part.

2. The method according to claim 1, wherein:
in the 360° panorama image at least one panorama object is depicted that represents a feature of the terrain surface and is linked with at least one surface tile and/or surface object that represent the same feature; and
the panorama image data comprises depth data, indicating a distance from a current map or panorama viewpoint to at least one panorama object depicted in the 360° panorama image.

3. The method according to claim 2, wherein the depth data comprises a depth map.

4. The method according to claim 2, wherein in the map view mode, a texture of surface tiles and/or objects representing features of the terrain surface is assigned from the panorama image data, based on the depth data.

5. The method according to claim 2, wherein in the map view mode and/or in the panorama view mode, object data of the linked surface tile and/or surface object is displayed together with the panorama object, the object data comprising address or location information associated with the feature.

6. The method according to claim 1, wherein the panorama element comprises a cube map, wherein the display surfaces are the inside surfaces of the four side faces and of the bottom face, wherein, depending on the field of view and orientation of the map viewpoint, between one and six faces of the cube map are displayed simultaneously, wherein one or two faces are not displayed when they are facing towards the map viewpoint, and the top face is not displayed, each displaying surface comprises a plurality of displaying tiles for displaying parts of the panorama preview image.

7. The method according to claim 1, wherein, in the map view mode, the user is enabled to move the map viewpoint relative to the panorama element, the panorama element, the panorama element maintaining a fixed orientation relative to the representation of the surface throughout the map view mode.

8. The method according to claim 7, wherein:
each display surface is assigned a part of the panorama preview image which it displays as long as the display surface visible, independent of the current position and orientation of the panorama element relative to the map viewpoint, and
which of the display surfaces is currently visible depends on the current position and orientation of the panorama element relative to the map viewpoint.

9. The method according to claim 1, wherein, in the map view mode, the user is enabled to move the map viewpoint relative to the panorama element, the panorama element maintaining a fixed orientation relative to the map viewpoint throughout the map view mode.

10. The method according to claim 9, wherein:
the same display surfaces of the panorama element are constantly visible, and
which part of the panorama preview image is currently displayed on these display surfaces depends on the current orientation of the panorama element relative to the coordinate reference system.

11. The method according to claim 1, wherein:
in the map view mode, the user is enabled to move the map viewpoint relative to the panorama element, wherein
a resolution and/or detail level of the panorama preview image depends on a distance of the panorama element to an actual position of the map viewpoint.

12. The method according to claim 1, wherein:
in the map view mode, backface culling and/or occlusion culling are used in such a way that
   hidden tiles of the terrain surface that are hidden from the map viewpoint by the panorama element are not rendered,
   external surfaces of the panorama element are not rendered, and/or
   hidden parts of the panorama preview image currently not being displayed on any one of the display surfaces are not rendered.

13. The method according to claim 1, wherein at least one of the display surfaces is partially transparent.

14. The method according to claim 13, wherein each of the display surfaces is assigned a certain degree of transparency.

15. The method according to claim 1, wherein switching from the map view mode to the panorama view mode and/or switching from the panorama view mode to the map view mode comprises alpha blending, wherein the representation of the terrain surface is visible behind the panorama image and/or behind the panorama preview image.

16. The method according to claim 1, wherein:
the map view mode comprises concurrently visualizing a multitude of panorama elements.

17. The method according to claim 16, wherein whether a panorama element of the multitude is visible or hidden depends on its distance to the map view point.

18. The method according to claim 16, wherein the user is enabled to decide for each of the panorama elements whether it is visible or hidden.

19. The method according to claim 18, wherein panorama element icons are provided in the map view mode to symbolize the location of hidden panorama elements, the panorama element icons being displayed on the representation of the terrain surface, positioned according to the panorama position data.

20. The method according to claim 18, wherein the panorama elements provide a hiding functionality, allowing the user to hide the respective panorama element.

21. The method according to claim 20, wherein the hiding functionality is provided as a selectable hiding key element and/or as a selectable option of a drop down menu of the respective panorama element.

22. The method according to claim 1, wherein:
the 360° panorama image shows the interior of a building or a model of the interior of a building;
the map view mode comprises visualizing a model of said building as a surface object; and
the selection of the model by a user triggers the visualizing of a respective panorama element.

23. The method according to claim 1, wherein:
the panorama data comprises video data;
the video data is related to a video stream comprising a multitude of panorama images, wherein the video stream is a 360° video stream; and
the panorama element displays a video stream of a multitude of panorama preview images.

24. The method according to claim 23, wherein the video stream comprises a real time video stream.

25. The method according to claim 1, wherein the terrain surface is a three-dimensional surface.

26. The method according to claim 1, wherein:
in the map view mode, the user is enabled to move the map viewpoint relative to the panorama element, wherein the panorama view mode is started by approaching or entering the panorama element with the map viewpoint.

27. The method according to claim 1, wherein the terrain surface is a map, an aerial image or a combination of a map and an aerial image.

28. The method according to claim 1, wherein the panorama position data comprises latitude and longitude values.

29. The method according to claim 1, wherein the panorama position data comprises values describing height, heading, roll, pitch, yaw, northing and/or easting of the panorama image.

30. The method according to claim 1, wherein the surface data comprises elevation data describing a geometry of the three-dimensional surface, and an elevation of the panorama element is computed depending on the elevation data.

31. A non-transitory computer program product, comprising programme code which is stored on a machine-readable medium, comprising a programme code segment, and having computer-executable instructions for providing a map view mode and a panorama view mode according to the method of claim 1.

32. The method according to claim 1, wherein:
in the 360° panorama image at least one panorama object is depicted that represents a feature of the terrain surface and is linked with at least one surface tile and/or surface object that represent the same feature; and
in the panorama view mode, for at least one panorama object that is depicted in the 360° panorama image, a position relative to the coordinate reference system is determined based on a position of the linked at least one surface tile and/or surface object relative to a coordinate reference system, and/or based on the depth data and on the panorama position data.

33. The method according to claim 32, wherein surface tiles and/or objects representing features of the terrain surface, which are positioned between a panorama object in the panorama image and the panorama viewpoint, are displayed.

34. The method according to claim 32, wherein in the map view mode, a texture of surface tiles and/or objects representing features of the terrain surface is assigned from the panorama image data, based on the depth data.

35. The method according to claim 32, wherein in the map view mode and/or in the panorama view mode, object data of the linked surface tile and/or surface object is displayed together with the panorama object, the object data comprising address or location information associated with the feature.

* * * * *